United States Patent
Sato et al.

(10) Patent No.: US 9,424,640 B2
(45) Date of Patent: Aug. 23, 2016

(54) PATHOLOGICAL DIAGNOSIS SUPPORT APPARATUS AND PATHOLOGICAL DIAGNOSIS SUPPORT METHOD

(71) Applicant: Panasonic Corporation, Osaka (JP)

(72) Inventors: Yoshikuni Sato, Fukui (JP); Hideto Motomura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 14/324,725

(22) Filed: Jul. 7, 2014

(65) Prior Publication Data

US 2015/0023573 A1 Jan. 22, 2015

(30) Foreign Application Priority Data

Jul. 18, 2013 (JP) ................................. 2013-149263

(51) Int. Cl.
*G06T 7/00* (2006.01)
*G06K 9/00* (2006.01)

(52) U.S. Cl.
CPC ......... *G06T 7/0012* (2013.01); *G06K 9/00147* (2013.01); *G06T 7/0081* (2013.01); *G06T 2207/10024* (2013.01); *G06T 2207/30024* (2013.01)

(58) Field of Classification Search
CPC ....................................................... G06T 7/00
USPC ........................................................ 382/103
See application file for complete search history.

(56) References Cited

U.S. PATENT DOCUMENTS

| 7,483,554 | B2* | 1/2009 | Kotsianti | G06K 9/00127 |
| | | | | 382/128 |
| 2010/0054560 | A1* | 3/2010 | Yamashita | A61B 5/055 |
| | | | | 382/128 |
| 2010/0272334 | A1* | 10/2010 | Yamada | G01N 1/312 |
| | | | | 382/128 |
| 2013/0136324 | A1* | 5/2013 | Sakamoto | G06T 7/0012 |
| | | | | 382/128 |
| 2013/0136325 | A1* | 5/2013 | Sakamoto | G06T 7/0012 |
| | | | | 382/128 |
| 2013/0156286 | A1* | 6/2013 | Holmes | G06T 7/0012 |
| | | | | 382/133 |

FOREIGN PATENT DOCUMENTS

| JP | 5-500152 | 1/1993 |
| WO | 90/10277 | 9/1990 |

* cited by examiner

*Primary Examiner* — Kim Vu
*Assistant Examiner* — Molly Delaney
(74) *Attorney, Agent, or Firm* — Wenderoth, Lind & Ponack, L.L.P.

(57) ABSTRACT

A pathological diagnosis support apparatus outputs a diagnostic region that is to be used as a target for diagnosis in a specimen image representing a specimen that is a target for pathological diagnosis, and includes: a target obtainment unit which obtains the specimen image and specimen information related to a scheme for preparing the specimen; a criterion obtainment unit which obtains a criterion corresponding to the specimen information from a database associating, for each of a plurality of specimens, specimen information related to a scheme for preparing each of the plurality of specimens with a criterion indicating a condition of a positive rate which is to be satisfied by the diagnostic region in a specimen image; and an output unit which outputs, as the diagnostic region, each of one or more regions in the specimen image having the positive rate determined to satisfy a condition indicated by the criterion obtained by the criterion obtainment unit.

12 Claims, 13 Drawing Sheets

410 Specimen information

| 411 Staining type | Ki-67 |
|---|---|
| 412 Name of preparatory institution | Institution 1 |

FIG. 6

| Specimen information | | Diagnostic criterion | |
|---|---|---|---|
| Name of preparatory institution | Staining type | Diagnostic threshold | Magnification |
| Institution 1 | Ki-67 | 10% | x20 |
| | ER | 100% | x10 |
| | PgR | 50% | x40 |
| | ... | ... | ... |
| Institution 2 | Ki-67 | 20% | x20 |
| | HER-2 | 20% | x20 |
| | IgG4 | 50% | x20 |
| | ... | ... | ... |
| ... | | | |
| Institution X | Ki-67 | 10% | x20 |
| | HER-2 | 20% | x10 |
| | ER | 80% | x10 |
| | ... | ... | ... |

| Case number | Name of preparatory institution | Staining type | Image identification information | Prognosis |
|---|---|---|---|---|
| 1 | Institution 1 | Ki-67 | Entire image 1 | Not recurred |
| 2 | Institution 1 | ER | Entire image 2 | Recurred |
| 3 | Institution 2 | HER-2 | Entire image 3 | Not recurred |
| ... | ... | ... | ... | ... |
| N | Institution 1 | Ki-67 | Entire image N | Not recurred |

FIG. 12

| Case number | Positive rate | | | ... | Prognosis |
| --- | --- | --- | --- | --- | --- |
| | Diagnostic threshold 10% | Diagnostic threshold 20% | Diagnostic threshold 30% | | |
| 1 | 36.9% | 12.5% | 6.3% | ... | Recurred |
| 2 | 20.8% | 8.0% | 7.3% | ... | Not recurred |
| 3 | 19.6% | 13.6% | 5.6% | ... | Recurred |
| 4 | 25% | 13.0% | 10.4% | ... | Not recurred |
| 5 | 40.1% | 32.6% | 22.7% | ... | Recurred |
| Prediction accuracy | 60% | 80% | 40% | | |

PATHOLOGICAL DIAGNOSIS SUPPORT APPARATUS AND PATHOLOGICAL DIAGNOSIS SUPPORT METHOD

CROSS REFERENCE TO RELATED APPLICATION

The present application is based on and claims priority of Japanese Patent Application No. 2013-149263 filed on Jul. 18, 2013. The entire disclosure of the above-identified application, including the specification, drawings and claims is incorporated herein by reference in its entirety.

FIELD

One or more exemplary embodiments disclosed herein relate generally to pathological diagnosis support apparatuses which support doctors to make a diagnosis using pathological images.

BACKGROUND

Pathological specimens are prepared through work processes including excision, fixation, embedding, sectioning, staining, and mounting, which involve a lot of man power. Therefore, pathological specimens prepared by different persons or using different types of institution equipment will be different. As a result, doctors' diagnosis based on images captured of pathological specimens may use various patterns of pathological images, which makes it difficult to provide a uniform diagnostic criterion.

Conventionally, a technique disclosed by Japanese Unexamined Patent Application Publication No. H5-500152 is known as a technique related to a quantitative analysis on pathological images. The technique of Japanese Unexamined Patent Application Publication No. H5-500152 includes automatically detecting cell nuclei and quantitatively determining a proliferation index of cells. Furthermore, the use of different staining techniques on the cell nuclei and proliferation substances enables accurate detection even in the case where test objects overlap.

Technical Problem

Even with the technique disclosed by Japanese Unexamined Patent Application Publication No. H5-500152, quantitative pathological diagnosis is difficult because there are no criteria for a target region for diagnosis (a diagnostic region) indicating which region in a pathological specimen is to be used in diagnosis as a target for diagnosis. In this regard, in the diagnosis based on images captured of pathological specimens, the use of the entire lesion site in the diagnosis is not always appropriate; in some cases, it is appropriate to use only a highly malignant site in the diagnosis. Moreover, which part (region) of a pathological specimen is to be used for making an appropriate diagnosis depends on how this pathological specimen was prepared, that is, a type of staining (a type of a test), an institution that prepared the pathological specimen, and so on.

SUMMARY

Thus, in order to enable quantification of diagnosis by removing the impact of a difference in process for preparing a pathological specimen, one non-limiting and exemplary embodiment provides a pathological diagnosis support apparatus and a pathological diagnosis support method for outputting a diagnostic region of a pathological specimen which is to be used in diagnosis.

Solution to Problem

In one general aspect, the techniques disclosed here feature a pathological diagnosis support apparatus which outputs a diagnostic region that is to be used as a target for diagnosis in a specimen image representing a specimen that is a target for pathological diagnosis, and the pathological diagnosis support apparatus includes: a target obtainment unit configured to obtain the specimen image and specimen information related to a scheme for preparing the specimen; a criterion obtainment unit configured to obtain, from a database, a criterion corresponding to the specimen information obtained by the target obtainment unit, the database associating, for each of specimens, specimen information related to a scheme for preparing the each of specimens with a criterion indicating a condition of a positive rate which is to be satisfied by a region that is a target for diagnosis in a specimen image representing the each of specimens; a determination unit configured to determine, based on the specimen image obtained by the target obtainment unit, whether or not a positive rate calculated for each of regions in the specimen image satisfies a condition indicated by the criterion obtained by the criterion obtainment unit; and an output unit configured to output, as the diagnostic region, each of one or more regions having the positive rate determined by the determination unit to satisfy the condition indicated by the criterion. In another general aspect, the techniques disclosed here feature a pathological diagnosis support method of displaying a diagnostic region that is to be used as a target for diagnosis in a specimen image representing a specimen that is a target for pathological diagnosis, and the pathological diagnosis support method includes: obtaining the specimen image and specimen information related to a scheme for preparing the specimen; obtaining, from a database, a criterion corresponding to the specimen information obtained in the obtaining of the specimen image and specimen information, the database associating, for each of specimens, specimen information related to a scheme for preparing the each of specimens with a criterion indicating a condition of a positive rate which is to be satisfied by a region that is a target for diagnosis in a specimen image representing the each of specimens; (i) determining, based on the specimen image obtained in the obtaining of the specimen image and specimen information, regions that are each for calculating a positive rate in the specimen image, (ii) calculating the positive rate of each of the regions, and (iii) determining whether or not the positive rate satisfies a condition indicated by the criterion obtained in the obtaining of a criterion; and outputting, as the diagnostic region, each of one or more regions having the positive rate determined in the determining (iii) to satisfy the condition indicated by the criterion.

Advantageous Effects

According to an exemplary embodiment disclosed herein, the pathological diagnosis support apparatus and the pathological diagnosis support method remove the impact of a difference in preparation scheme including a type of staining, thereby quantifying diagnosis.

BRIEF DESCRIPTION OF DRAWINGS

These and other objects, advantages and features of the invention will become apparent from the following descrip

FIG. 6 illustrates an example of content in a database.

FIG. 12 illustrates an example of prediction accuracy for each diagnostic threshold.

DESCRIPTION OF EMBODIMENTS

Figure 1:
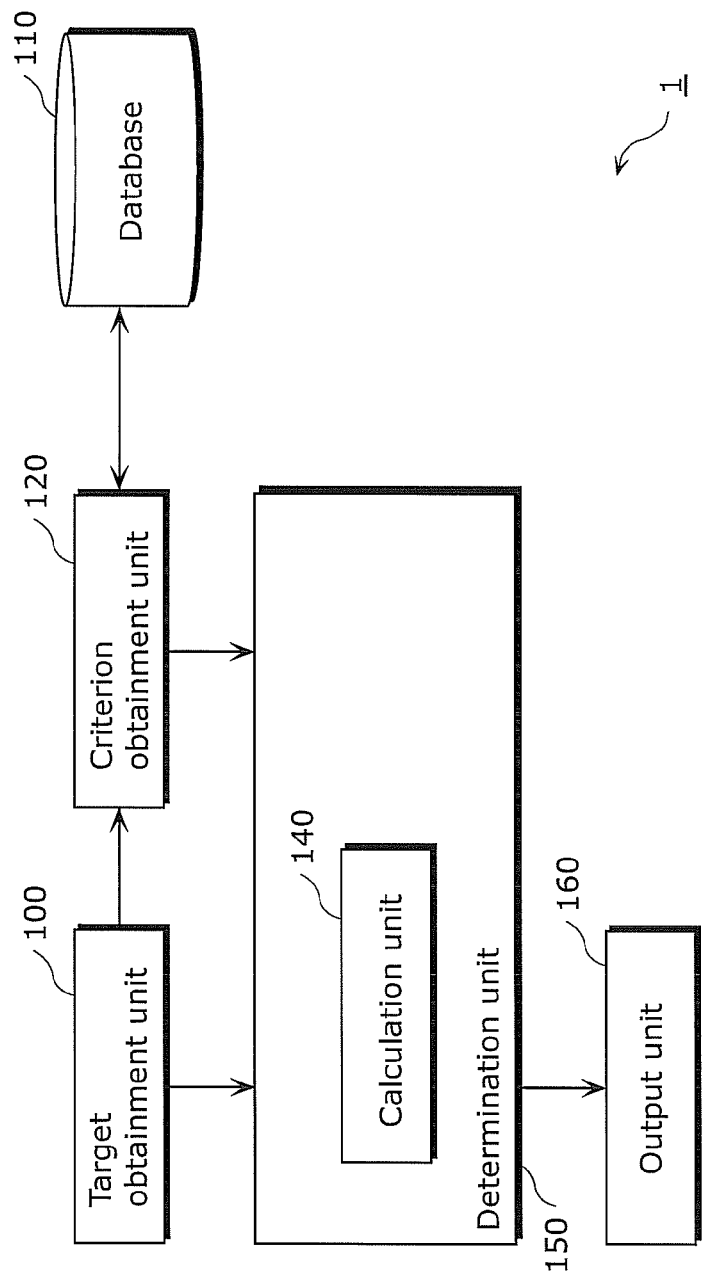
- FIG. 1 is a block diagram of a pathological diagnosis support apparatus according to Embodiment 1 of the present disclosure.

In order to enable quantification of diagnosis (pathological diagnosis) using a pathological specimen, a pathological diagnosis support apparatus according to an exemplary embodiment disclosed herein is a pathological diagnosis support apparatus which outputs a diagnostic region that is to be used as a target for diagnosis in a specimen image representing a specimen that is a target for pathological diagnosis, and the pathological diagnosis support apparatus includes: a target obtainment unit configured to obtain the specimen image and specimen information related to a scheme for preparing the specimen; a criterion obtainment unit configured to obtain, from a database, a criterion corresponding to the specimen information obtained by the target obtainment unit, the database associating, for each of specimens, specimen information related to a scheme for preparing the each of specimens with a criterion indicating a condition of a positive rate which is to be satisfied by a region that is a target for diagnosis in a specimen image representing the each of specimens; a determination unit configured to determine, based on the specimen image obtained by the target obtainment unit, whether or not a positive rate calculated for each of regions in the specimen image satisfies a condition indicated by the criterion obtained by the criterion obtainment unit; and an output unit configured to output, as the diagnostic region, each of one or more regions having the positive rate determined by the determination unit to satisfy the condition indicated by the criterion. Here, the positive rate is a ratio of the number of positive nuclei to the total number of cell nuclei in a region. With this, a criterion set for each scheme for preparing a pathological specimen is obtained from the database, and a diagnostic region is determined based on this criterion, which make it possible to remove the impact of a difference in preparation scheme including a type of staining, thereby quantifying diagnosis.

Here, for example, the pathological diagnosis support apparatus may include a calculation unit configured to determine the regions that are each for calculating the positive rate in the specimen image, and calculate the positive rate. With this, a positive rate is calculated in the pathological diagnosis support apparatus as well, with the result that the processing efficiency can be higher than in the case where a process of calculating a positive rate for each region is left to an external apparatus.

Furthermore, the output unit may be further configured to output, for each of the one or more regions outputted as the diagnostic region, the positive rate calculated by the calculation unit. With this, the positive rate for each diagnostic region is output to a display, for example, so that doctors can be supported to make a quick, accurate diagnosis.

Furthermore, it may be that the specimen image represents an entirety of the specimen, and the output unit is configured to output an image of the diagnostic region and an image reduced in size from the specimen image and representing a position of the diagnostic region. With this, the image reduced in size from the specimen image and the image of the diagnostic region are output to a display, for example, so that doctors can easily check a position and the image of the diagnostic region.

Furthermore, it may be that the calculation unit is further configured to calculate an overall positive rate of all the one or more regions each having the positive rate determined by the determination unit to satisfy the condition indicated by the criterion, and the output unit is further configured to output the overall positive rate. With this, an overall positive rate of all the diagnostic regions is output to a display, for example, which improves doctors' convenience.

Furthermore, the specimen information related to the scheme for preparing the specimen may indicate information identifying a type of staining used for the specimen or an institution that prepared the specimen. With this, even when the schemes for preparing a pathological specimen are different because the types of staining used for the pathological specimen or the institutions that prepared the pathological specimen are different, the impact of such difference can be removed so that a diagnostic region can be appropriately determined and output.

Furthermore, it may be that the criterion associated in the database with the specimen information related to the scheme for preparing the specimen indicates an upper limit of a ratio of a total size of regions selected in a descending order of the positive rate calculated for each of the regions in the specimen image representing the specimen, relative to a size of an entire region of the specimen image, and the determination unit is configured to determine that a positive rate of each of one or more regions having a total size smaller than or equal to the upper limit indicated by the criterion satisfies the condition, the one or more regions being selected in the descending order of the positive rate calculated for each of the regions in the specimen image. This allows relative conditioning which is based on the positive rate in order to remove the impact of a difference in scheme for preparing a pathological specimen so that a diagnostic region can be appropriately extracted.

Furthermore, it may be that the criterion further includes magnification information indicating a size of a region the positive rate of which is to be calculated, and the determination unit is configured to determine whether or not a positive rate calculated for each of regions having a size indicated by the magnification information in the specimen image satisfies the condition indicated by the criterion except the magnification information. With this, it is possible to remove the impact of a difference in magnification between the specimen images of the pathological specimen, thereby quantifying diagnosis.

Furthermore, it may be that the criterion indicates a lower limit of the positive rate, and the determination unit is configured to determine that a positive rate of a region among the regions in the specimen image for each of which the positive rate is calculated satisfies the condition when the positive rate of the region is greater than or equal to the lower limit indicated by the criterion. This allows conditioning which is based on the lower limit of the positive rate in order to remove the impact of a difference in scheme for preparing a pathological specimen so that a diagnostic region can be appropriately extracted.

Furthermore, a pathological diagnosis support method according to an exemplary embodiment disclosed herein is a pathological diagnosis support method of displaying a diagnostic region that is to be used as a target for diagnosis in a specimen image representing a specimen that is a target for pathological diagnosis, and the pathological diagnosis support method includes: obtaining the specimen image and specimen information related to a scheme for preparing the specimen; obtaining, from a database, a criterion corresponding to the specimen information obtained in the obtaining of the specimen image and specimen information, the database associating, for each of specimens, specimen information related to a scheme for preparing the each of specimens with a criterion indicating a condition of a positive rate which is to be satisfied by a region that is a target for diagnosis in a specimen image representing the each of specimens; (i) determining, based on the specimen image obtained in the obtaining of the specimen image and specimen information, regions that are each for calculating a positive rate in the specimen image, (ii) calculating the positive rate of each of the regions, and (iii) determining whether or not the positive rate satisfies a condition indicated by the criterion obtained in the obtaining of a criterion; and outputting, as the diagnostic region, each of one or more regions having the positive rate determined in the determining (iii) to satisfy the condition indicated by the criterion. Thus, as a result of obtaining, from the database, a criterion set for each scheme for preparing a pathological specimen, and determining a diagnostic region based on this criterion, it is possible to remove the impact of a difference in preparation scheme including a type of staining, thereby quantifying diagnosis.

Here, for example, the condition of the positive rate which is to be satisfied by the region that is the target for diagnosis in the specimen image representing the specimen, indicated by the criterion in the database which is used in the obtaining of a criterion, may be a condition under which it is predicted from past diagnosis results based on specimens that a probability that a result of a diagnosis made using a region satisfying the condition as the target for diagnosis is appropriate is higher than a predetermined threshold. This makes it possible to determine a diagnostic region that is effective in improving diagnosis accuracy.

These general and specific embodiments include one or more combinations of an apparatus, a system, a method, an integrated circuit, a computer program, and a computer-readable recording medium.

Hereinafter, the embodiments are described with reference to the Drawings. Each of the embodiments described herein shows a specific example of the inventive concept. Thus, the numerical values, shapes, materials, structural elements, the arrangement and connection of the structural elements, steps, the processing order of the steps, etc. shown in the following embodiments are mere examples, and therefore do not limit the scope of the appended Claims and their equivalents. Among the structural elements in the following embodiments, structural elements not recited in any one of the independent claims are those that can be added arbitrarily. Each figure is a schematic view and therefore is not necessarily an exact illustration.

Each of the present embodiments describes, in particular, a pathological diagnosis support apparatus, as an aspect, which performs a pathological diagnosis support method for quantifying diagnosis by removing the impact of a difference in scheme for preparing a pathological specimen.

(Embodiment 1)

Hereinafter, a pathological diagnosis support apparatus 1 according to an embodiment of the present disclosure is described with an appropriate use of the drawings.

(Structure)

FIG. 1 is a block diagram of a pathological diagnosis support apparatus according to Embodiment 1 of the present disclosure.

The pathological diagnosis support apparatus 1 is configured as a computer which includes a memory, a processor, an input interface, a display, and so on, and extracts a diagnostic region which is to be used as a target for diagnosis from an image captured of a whole pathological specimen, to support doctors to make a diagnosis (conduct a medical test). Functionality-wise, this pathological diagnosis support apparatus 1 includes a target obtainment unit 100, a database 110, a criterion obtainment unit 120, a determination unit 150, and an output unit 160 as illustrated in FIG. 1. The input interface accepts input from a keyboard, a pointing device, etc., and a digital slide scanner for image input, etc. The memory is read-only memory (ROM), random-access memory (RAM), or the like. Into the memory, a control program for performing a control process in which each unit of the pathological diagnosis support apparatus 1 is controlled and setting values and so on for use in the control program are stored. Furthermore, the memory is used also for temporary storage of each value which is used in execution of the control program by the processor. In this pathological diagnosis support apparatus 1, the processor executes the control program stored in the memory, thereby effecting a function of each functional block illustrated in FIG. 1.

Figure 2:
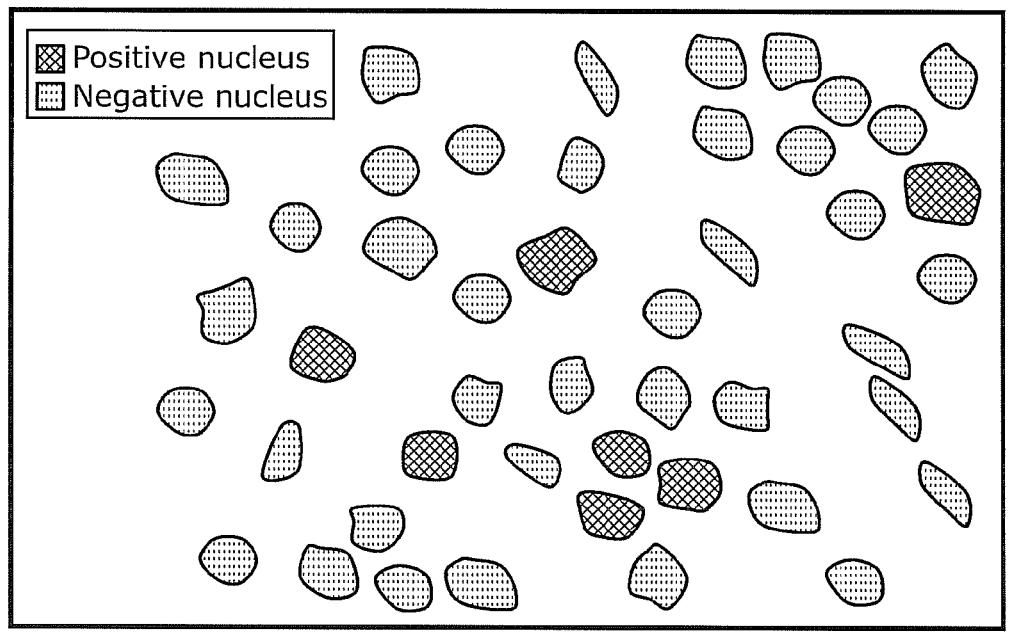
FIG. 2 illustrates an image example of a Ki-67-stained specimen.

The target obtainment unit 100 has functions of obtaining an image representing the entirety of a pathological specimen which is a test target (a specimen image) and specimen information indicating a type of the pathological specimen, transferring the specimen information to the criterion obtainment unit 120, and transferring the specimen image and the specimen information to the determination unit 150. The target obtainment unit 100 obtains the specimen image and the specimen information through the input interface of the computer. This specimen information relates to a scheme for preparing the pathological specimen, such as a type of staining used for the pathological specimen (a type of a test) and a name of an institution in which the pathological specimen was prepared. It is to be noted that the name of the institution is useful information because the reagent or equipment used is different depending on the institution in which the pathological specimen was prepared. Furthermore, as the specimen information, a concentration of fixative, a time length of fixation, a time length of staining, etc., at the stage of preparing the pathological specimen, and a name of a person who prepared the pathological specimen, etc., may be used. As an example of the specimen image, an image of a Ki-67-stained specimen is illustrated in FIG. 2. In the Ki-67 staining test, the pathological specimen is stained so that positive nuclei will have a reddish-brown color and negative nuclei will have a blue color, and a positive rate is calculated which is a ratio of the number of positive nuclei to the total number of cell nuclei.

The database 110 is a database in which a diagnostic criterion corresponding to the specimen information on each of the pathological specimens is stored. This diagnostic criterion is for determining a region that is to be used in diagnosis (a diagnostic region) in the specimen image representing the entirety of the pathological specimen and indicates a condition of a positive rate which is to be satisfied by the diagnostic region (such as a threshold and magnification information indicating a size of the region, for example).

The criterion obtainment unit 120 has functions of obtaining, from the database 110, the criterion corresponding to the specimen information obtained by the target obtainment unit 100, and transferring the criterion to the determination unit 150.

The determination unit 150 includes a calculation unit 140 as a functional structural element and has a function of determining whether or not the positive rate calculated by the calculation unit 140 for each of the regions of the specimen image transferred from the target obtainment unit 100 satisfies the condition indicated by the criterion transferred from the criterion obtainment unit 120. The calculation unit 140 has functions of determining regions that are each for calculating a positive rate in the specimen image, and calculating the positive rate of each of the regions (a ratio of the number of positive nuclei to the total number of cell nuclei in the region) through image processing. The size of the region is determined, for example, according to the magnification information included in the criterion. The positive rate is determined as a ratio of the number of positive nuclei to the sum of the number of positive nuclei and the number of negative nuclei where the number of positive nuclei is the number of pixel sets of positive nuclei (of a reddish-blown color in the Ki-67-stained example) counted in an image of the region and the number of negative nuclei is the number of pixel sets of negative nuclei (of a blue color in the same example) counted in the image, for example. It is to be noted that among the regions, one or more regions that each have a positive rate determined by the determination unit 150 to satisfy the condition indicated by the criterion will each be used as the diagnostic region.

The output unit 160 has a function of outputting the region determined by the determination unit 150 to satisfy the criterion (the diagnostic region). This output is achieved in the form of presentation on the display. Furthermore, this output may be output to outside the pathological diagnosis support apparatus 1 (such as output of signals to an external display device, a processing device, and so on). It is to be noted that displaying the diagnostic region on the display may take the form of displaying a reduced image representing the entirety of the specimen image and information indicating a position of the diagnostic region in addition to the reduced image or take the form of displaying a non-reduced image of the diagnostic region. Furthermore, the output unit 160 may display the positive rate calculated for the diagnostic region by the calculation unit 140. It may also be that the calculation unit 140 further calculates, for the entirety of the diagnostic regions, an overall positive rate which is a ratio of the total number of positive nuclei to the total number of cell nuclei, and the output unit 160 displays this overall positive rate. Furthermore, the output unit 160 may display information related to a type of a test etc., and a criterion for diagnosis, etc.

(Operation)

An operation of the pathological diagnosis support apparatus 1 having the above-described structure is described below with reference to FIG. 3.

Figure 3:
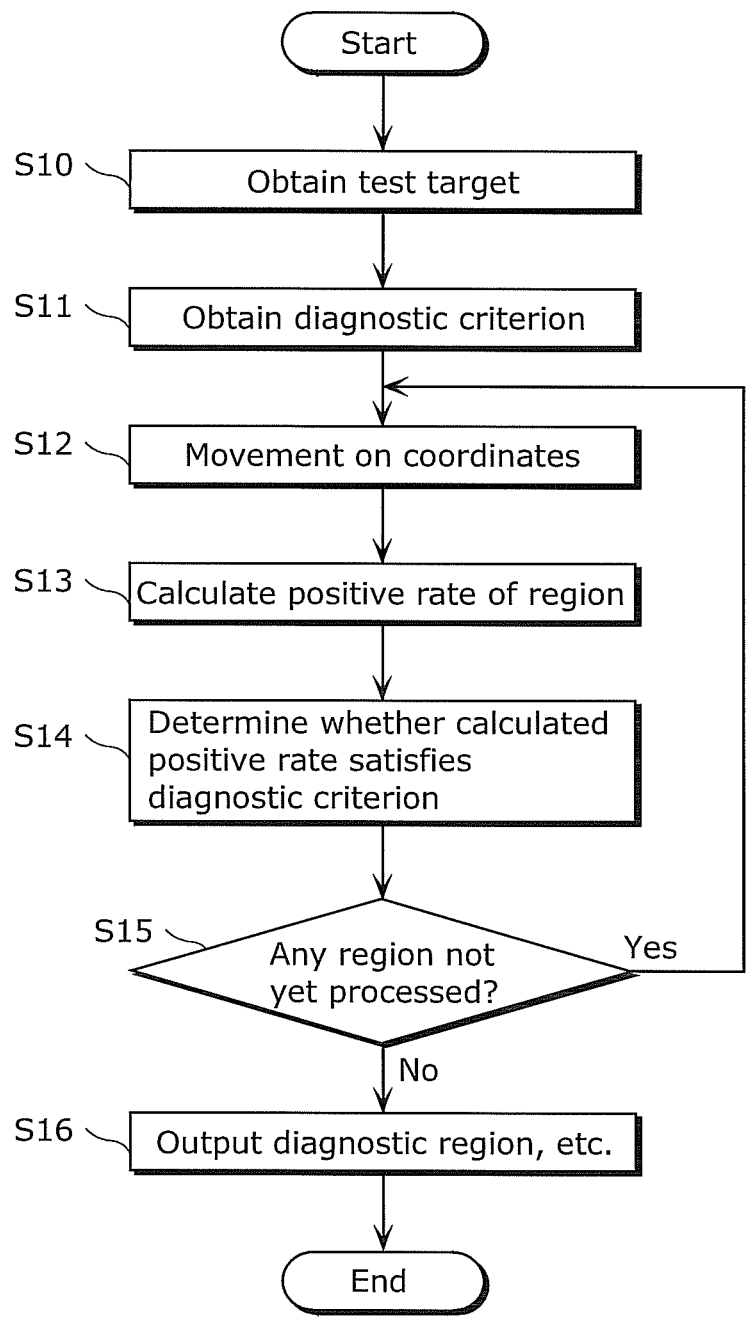
FIG. 3 is a flowchart indicating an operation of the pathological diagnosis support apparatus.

FIG. 3 is a flowchart indicating an operation of the pathological diagnosis support apparatus 1.

In the pathological diagnosis support apparatus 1, the target obtainment unit 100 first obtains an image representing the entirety of a pathological specimen which is a test target (a specimen image) and information related to a scheme for preparing the pathological specimen (specimen information) (Step S10).

Figures 4A, 4B:
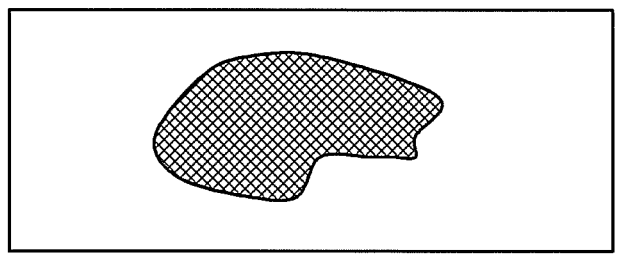
FIG. 4A illustrates an example of a specimen image.
FIG. 4B illustrates an example of specimen information.
Figure 5:
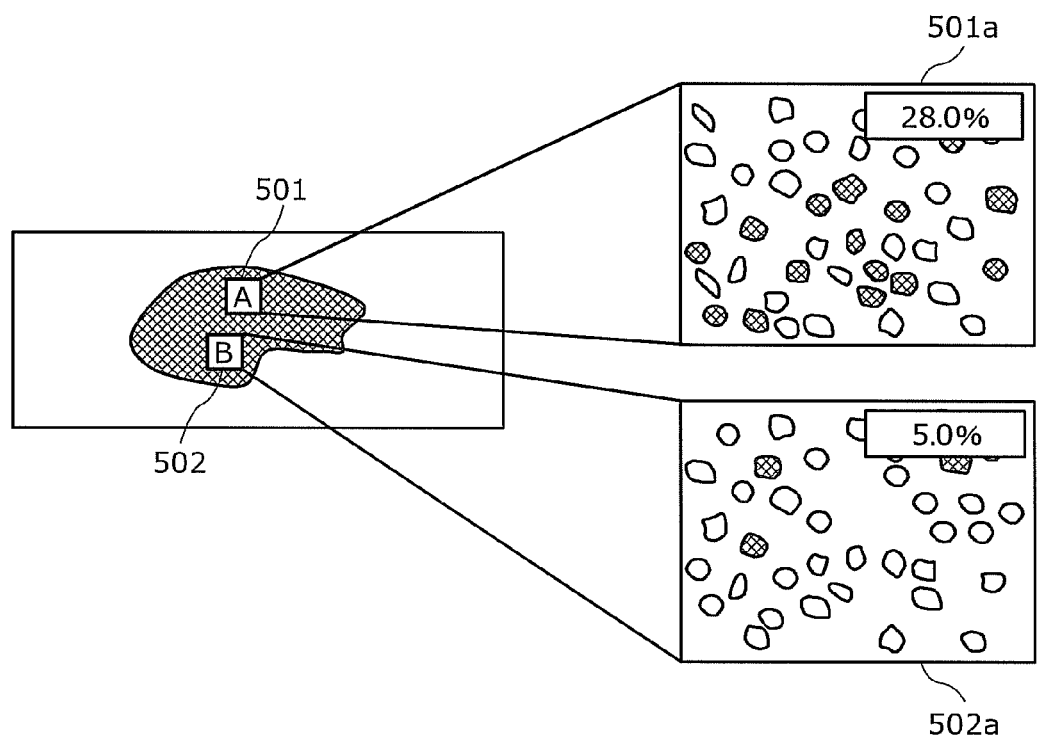
FIG. 5 illustrates an example of a specimen that includes regions having positive rates different from each other.

FIG. 4A illustrates an example of this specimen image obtained. The specimen image illustrated in FIG. 4A is an image of the entirety of the pathological specimen retrieved by a digital slide scanner or the like which captures an image of the entire slide glass on which the pathological specimen (the entire preparation) is placed and processes the captured image into a digital image. The whole image of the pathological specimen is zoomed out in FIG. 4A, which, when zoomed in, looks like the image illustrated in FIG. 2. By the way, the whole image of a pathological specimen covers so wide a range that a diagnosis is generally not made based on the whole range of the pathological specimen, but on only some regions therein. However, even within a single pathological specimen, parts thereof are in various states with very high diversity; the result of a diagnosis may vary to a great extent depending on which part is used in the diagnosis. Specifically, in the case of the Ki-67 staining test, for example, a single pathological specimen has a mixture of a part with a high positive rate and a part with a low positive rate as illustrated in FIG. 5. In the example of FIG. 5, as indicated in an enlarged image 501a of a region 501 denoted by A in a pathological specimen, the positive rate of this region 501 is 28.0%, and as indicated in an enlarged image 502a of a region 502 denoted by B in the pathological specimen, the positive rate of this region 502 is 5.0%. There is no strict rule about what region is to be used in a diagnosis as a target for diagnosis, that is, the current situation is that how to select a target region for diagnosis depends on each doctor. In this regard, using the database 110 in which a criterion indicating a condition for specifying a diagnostic region is associated with specimen information, the pathological diagnosis support apparatus 1 determines a diagnostic region based on the specimen information obtained in Step S10.

FIG. 4B illustrates an example of this specimen image obtained. The specimen information 410 illustrated in FIG. 4B includes a staining type 411 and a name of preparatory institution 412. The staining type 411 indicates, for example, a type of staining (a type of a test) such as Ki-67 staining. The name of preparatory institution 412 is a name for identifying an institution that prepared the pathological specimen.

Next, in the pathological diagnosis support apparatus 1, the criterion obtainment unit 120 obtains, from the database 110, a criterion that corresponds to the specimen information obtained in Step S10 (a diagnostic criterion) (Step S11).

An example of content in this database 110 is illustrated in FIG. 6. As illustrated in FIG. 6, the database 110 includes a table in which specimen information 610 and a diagnostic criterion 620 are associated with each other. The specimen information 610 is related to a scheme for preparing a pathological specimen and includes a name of preparatory institution 611 and a staining type 612. The diagnostic criterion 620 indicates a condition that is to be satisfied by a region used as a target for diagnosis in an image of a pathological specimen (a condition of a positive rate) and includes a diagnostic threshold 621 and magnification 622.

Figure 7A:
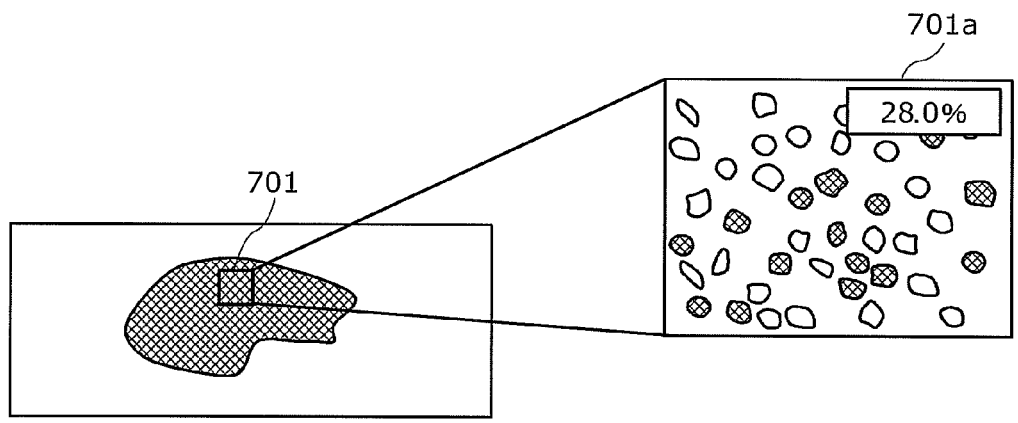
FIG. 7A illustrates a region that satisfies a condition indicated by a diagnostic threshold (a lower limit of a positive rate) which is a diagnostic criterion.

The diagnostic threshold 621 indicates a lower limit of a positive rate, that is, a criterion for determining a region having a positive rate greater than or equal to a threshold to be a diagnostic region. FIG. 7A indicates that a region 701 having a positive rate greater than or equal to 10% is determined to be a diagnostic region when the diagnostic threshold 621 is 10%.

Figure 7B:
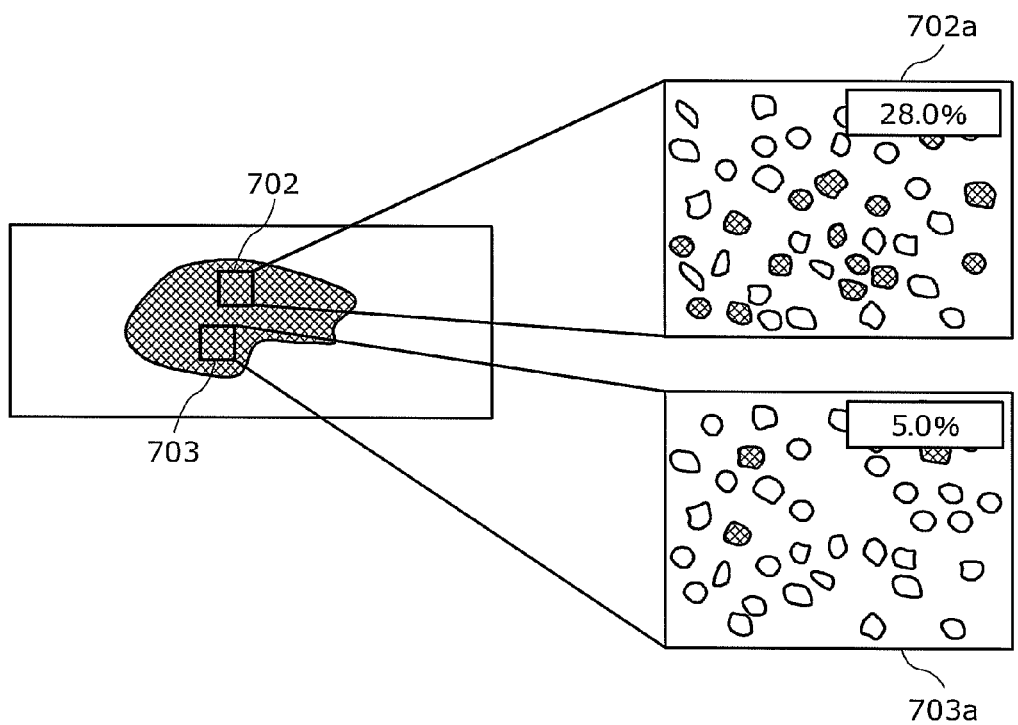
FIG. 7B illustrates an example of a region that satisfies a condition indicated by a diagnostic threshold (an upper limit of a ratio to the entire region) which is a diagnostic criterion.

As illustrated in an enlarged image 701a of the region 701, this region 701 has a positive rate of 28.0% which is in the range greater than or equal to the diagnostic threshold 621. It is to be noted that the diagnostic threshold 621 may be an upper limit of a ratio of the total size of regions selected in the descending order of the positive rate calculated for each of the regions in the specimen image, relative to the size of the entire region of the specimen image, that is, a threshold indicating up to what percentage of the entire region, when a region is selected therefrom for having a relatively high positive rate, is allowed to be a diagnostic region. FIG. 7B indicates that when the diagnostic threshold is 10% in this case, a region 702 and a region 703 in the specimen image which have the highest and second highest positive rates in the entire region of the specimen image are each determined to be a diagnostic region if the total size of the region 702 and the region 703 is 10% or less of the size of the entire region. As illustrated in an enlarged image 702a of the region 702, this region 702 has a positive rate of 28.0%, and as illustrated in an enlarged image 703a of the region 703, this region 703 has a positive rate of 5.0%. Thus, in the case of FIG. 7B, a region having a relatively high positive rate is determined to be a diagnostic region.

The magnification 622 is magnification information indicating a size of a region the positive rate of which is to be calculated. The size of each region the positive rate of which is to be calculated is determined by multiplying a standard region size (e.g., 0.2 millimeters square in actual dimensions or e.g., 10 pixels square measured in pixel count) by a value indicated by the magnification information (e.g., 20-fold), for example.

The condition indicated by the diagnostic criterion 620 is determined based on a relationship between past results of diagnosis and prognoses on pathological specimens so that the prediction accuracy of prognosis in the case where a diagnosis is made using a region that satisfies the condition as a target for diagnosis will exceed a predetermined level (e.g., 70% accuracy). It is to be noted that in the case where there are two or more conditions (thresholds) that each have a prediction accuracy exceeding the predetermined level, it will be useful if the diagnostic criterion indicating one of the conditions which has the highest accuracy is stored into the database 110. Thus, the diagnostic criterion corresponding to the specimen information (what may be called a guideline for observing the specimen image) is stored in the database 110, making it possible to unify the determination of a diagnostic region which is to be used in diagnosis in the pathological specimen so that the diagnostic region is the same regardless of who makes the diagnosis. This allows the pathological diagnosis support apparatus 1 to contribute to realizing the quantification of diagnosis. The creation of this database 110 will be described later. In Step S11, the criterion obtainment unit 120 obtains a diagnostic criterion including a diagnostic threshold of 10% and 20-fold magnification that corresponds to the specimen information illustrated in FIG. 4B, for example (see FIG. 6).

Figure 8:
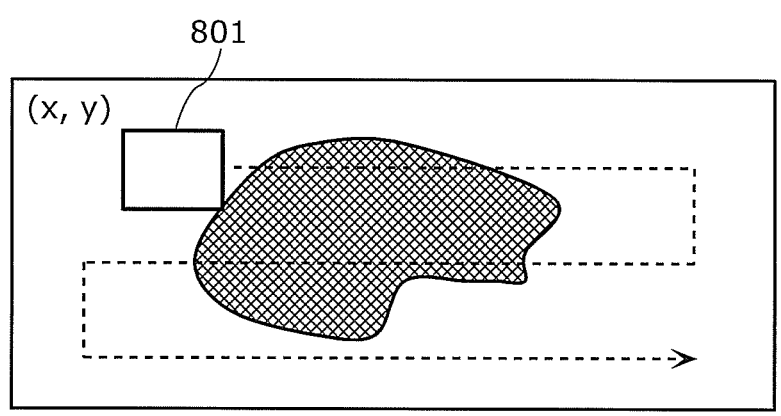
FIG. 8 illustrates how each region the positive rate of which is to be calculated moves to determine a diagnostic region in a pathological specimen.

Next, in the pathological diagnosis support apparatus 1, the calculation unit 140 determines, based on the magnification information, a size of a region the positive rate of which is to be calculated, in the specimen image obtained in Step S10, and determines positional coordinates of the region (Step S12). The positional coordinates are determined using a region 801 which moves to sequentially different positions in the specimen image as illustrated in FIG. 8. Suppose that X1 and Y1 are the number of columns and the number of rows, respectively, of pixels arranged in matrix form in the specimen image and X2 and Y2 are a width and a height, respectively, of a region the positive rate of which is to be calculated, the calculation unit 140 sequentially moves coordinates (x, y) on the upper left of the region the positive rate is to be calculated, in the range of $0 \leq x \leq X1-X2$ and $0 \leq y \leq Y1-Y2$, thereby determining positional coordinates of the region. The movement of the positional coordinates may be pixel-by-pixel movement or, where priority is given to the processing speed, may be movement for every certain number of pixels which is two or more. It is to be noted that the positional coordinates of the region 801 move so that no position is determined which overlaps a region determined to be a diagnostic region in Step S14 which will be described later.

The calculation unit 140 calculates a positive rate of a region upon each of the sequential determinations on positions of regions (Step S13). Here, it may be that the pathological diagnosis support apparatus 1 includes an imaging unit which captures an image of a pathological specimen to form an image of each region so that moving the imaging unit along the course indicated by an arrow in FIG. 8 allows the entire region of the pathological specimen to be scanned. In this case, the calculation unit 140 will calculate a positive rate in Step S13 based on the image of each region captured by this imaging unit.

In Step S13, image processing is performed on the region determined in Step S12, to detect positive nuclei and negative nuclei, and a ratio of the number of positive nuclei to the number of cell nuclei (the sum of the number of positive nuclei and the number of negative nuclei) is calculated as a positive rate. A method used to detect these positive nuclei and negative nuclei is determining, for each pixel in the region, whether the pixel represents a positive nucleus, a negative nucleus, or neither one of them (cytoplasm), based on RGB color information (luminance information) of the pixel, for example. In this determination, simple threshold processing may be used or alternatively, an approach such as a support vector machine (SVM) may also be used. In either case, a teaching image in which positive nuclei and negative nuclei are manually distinguished is prepared in advance, and a threshold or a parameter for determination for use in SVM is set through learning based on this teaching image. Here, no less than a few hundred teaching images are used in the learning, for example. It is to be noted that in order to calculate a positive rate with precision, the connection relationship of pixels may be analyzed so that a boundary between pixel sets representing cell nuclei can be identified, allowing them to be separated and counted one by one. In this regard, since the positive nuclei and the negative nuclei have substantially the same size, it may be possible to calculate a positive rate based on the counted number of pixels determined to be positive nuclei and the counted number of pixels determined to be negative nuclei. In this case, the positive rate can be calculated at relatively high speed.

Next, the determination unit 150 determines whether the positive rate calculated by the calculation unit 140 in Step S13 satisfies the condition indicated by the diagnostic criterion obtained by the criterion obtainment unit 120 (Step S14). For example, when the diagnostic threshold in the diagnostic criterion obtained in Step S11 is 10%, a region having a positive rate of 10% or more is determined to be a diagnostic region and the other region is not used in diagnosis.

The pathological diagnosis support apparatus 1 returns to Step 12 when any region the positive rate of which has not yet been calculated remains in the entire pathological specimen, and selects a region the positive rate of which is to be calculated (positioning) (Step S15).

Figure 9:
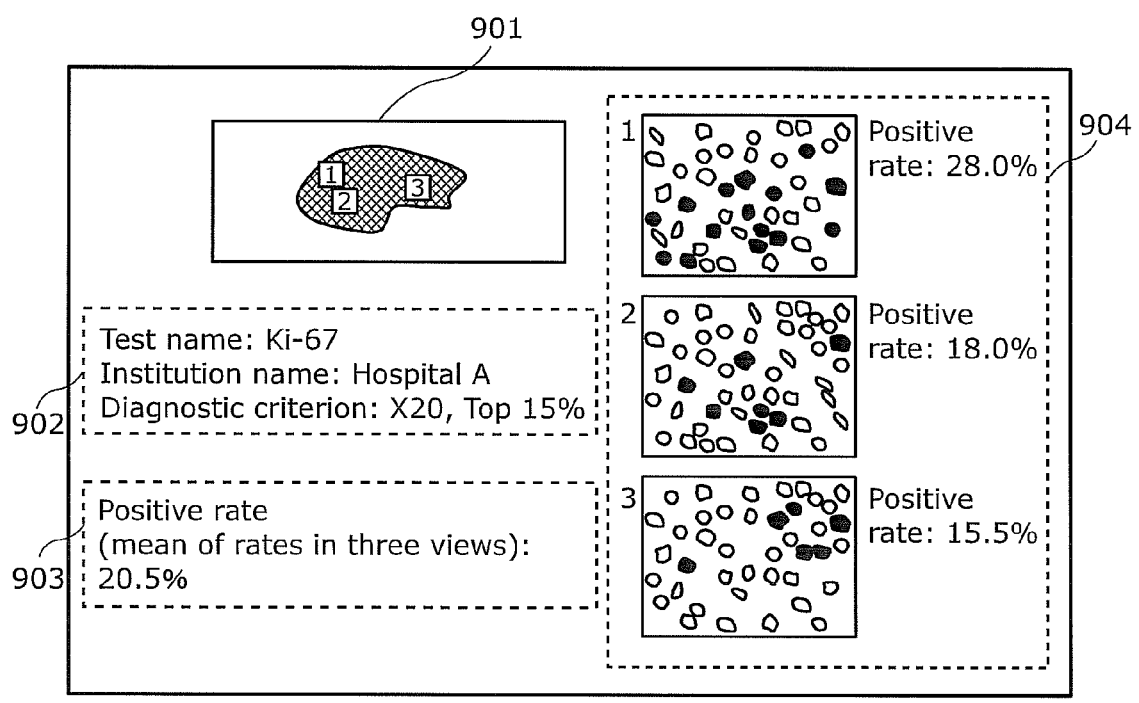
FIG. 9 illustrates an example of a screen displayed on a display.

When all the regions in the entire pathological specimen have undergone the calculation of positive rates and the determination as to whether or not the regions satisfy the condition indicated by the diagnostic criterion (whether or not each of the regions is determined to be a diagnostic region), the output unit 160 outputs the diagnostic region, etc. (Step S16). In other words, the output unit 160 outputs one or more regions (diagnostic region) determined by the determination unit 150 to satisfy the diagnostic criterion. FIG. 9 illustrates an example of a screen displayed on the display of the pathological diagnosis support apparatus 1. The screen in this figure includes: an image 901 which is a reduced image representing the entirety of the specimen image and indicates the position of each diagnostic region; information 902 indicating specimen information and a diagnostic criterion; information 903 indicating an overall positive rate of the entire diagnostic region; and an image group 904 which includes an enlarge image of each diagnostic region and indicates a positive rate thereof.

In this manner, the pathological diagnosis support apparatus 1 automatically extracts and outputs a diagnostic region suited to diagnosis, with reference to a diagnostic criterion that corresponds to specimen information. As a result, diagnosis is quantified.

(Creation of Database)

The following describes creation of the above-stated database 110.

In order to determine a diagnostic region of the pathological specimen according to the specimen information, the database 110 in which the diagnostic criterion corresponding to the specimen information is stored is created from a case database in which the cases of diagnosis made in the past based on pathological specimens are collected, for example.

Figure 10:
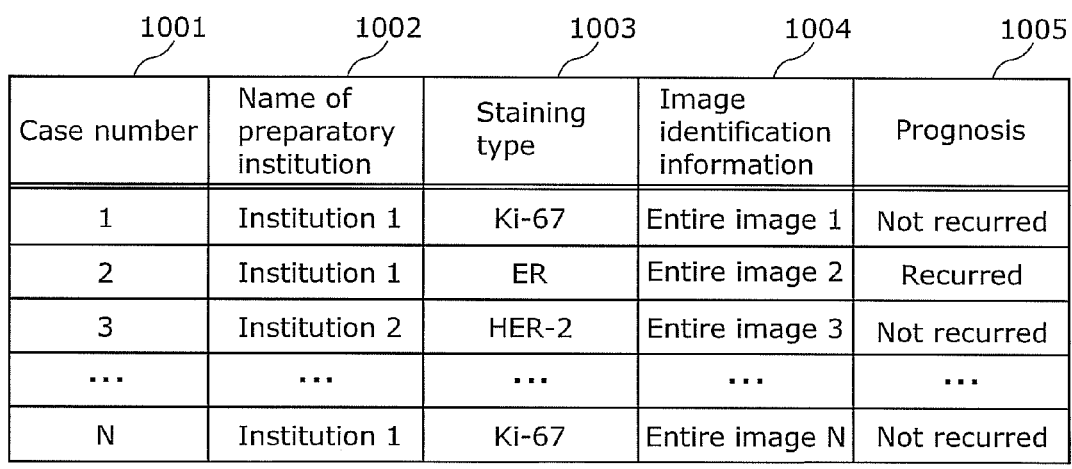
FIG. 10 illustrates an example of content in a case database.

FIG. 10 illustrates an example of the case database. The case database accumulates, for each case, a case number 1001, a name of preparatory institution 1002, a staining type 1003, image identification information 1004, and prognosis 1005 in association with one another. The name of preparatory institution 1002 is a name for identifying an institution that prepared the pathological specimen used in the case, and the staining type 1003 indicates a type of staining (a type of a test) used for the pathological specimen. The image identification information 1004 is information for identifying the entire image of the pathological specimen, and the prognosis 1005 is information indicating a course following the diagnosis made based on the pathological specimen (what ultimately became of the patient's condition) in the case. These pieces of information have generally been stored in a picture archiving and communication system (PACS) or an electronic health record introduced in hospitals. Using such a case database, the database 110 as illustrated in FIG. 6 is created.

A conceivable method of determining a diagnostic criterion is determining a diagnostic criterion using the prognosis in the past cases as a teaching material so that prognosis can be predicted with high accuracy. The following describes an example of determining, as the diagnostic criterion, an upper limit of a ratio of the total size of regions selected in the descending order of the positive rate calculated for each of the regions in the specimen image, relative to the size of the entire region of the specimen image, that is, a diagnostic threshold indicating up to what percentage of the entire region a region having a high positive rate is determined as a diagnostic region.

Figure 11:
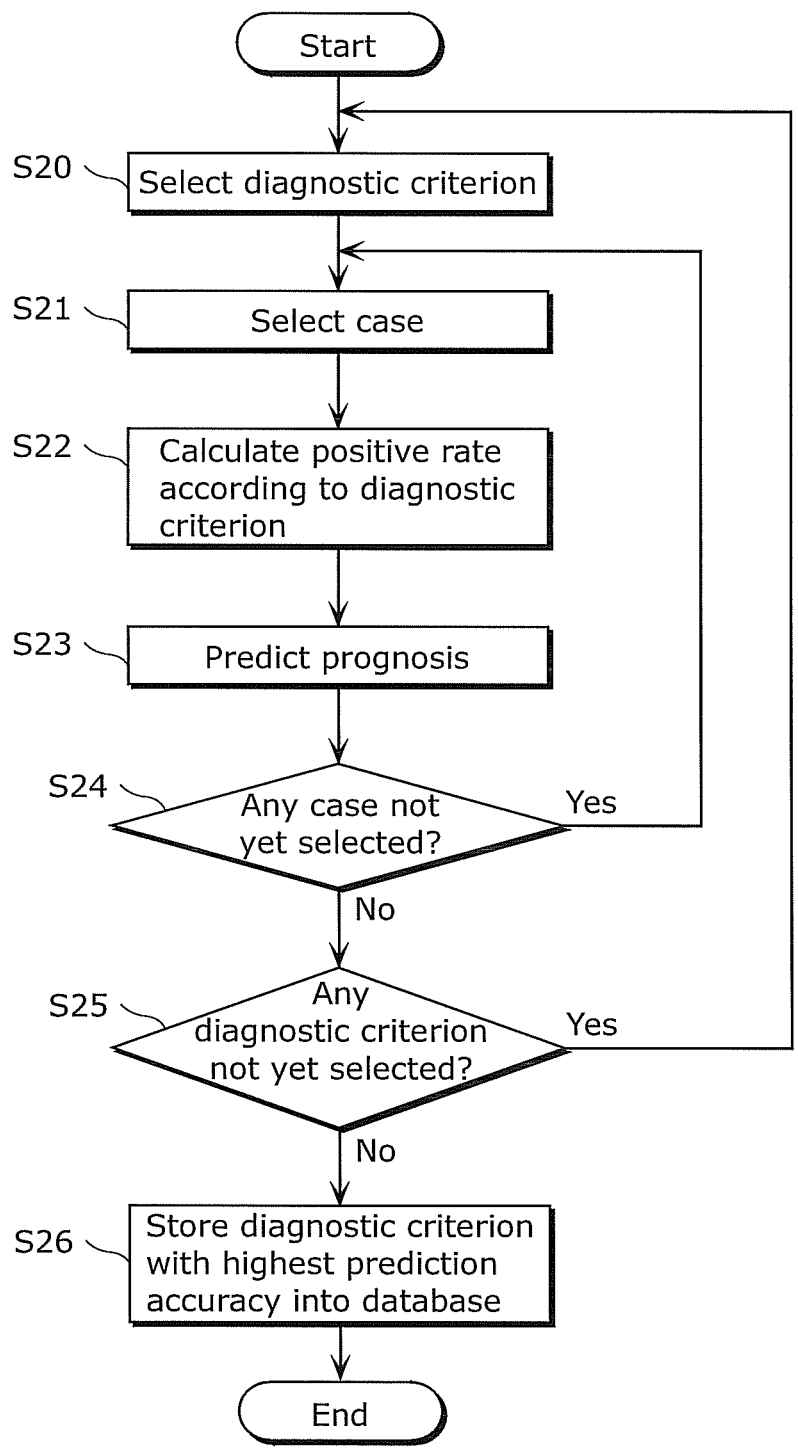
FIG. 11 is a flowchart indicating a process for creating the database.

FIG. 11 is a flowchart indicating a process for creating the database 110 using the prognosis in the case database as a teaching material. In this process, the cases in the case database are classified by specimen information (preparatory institution and staining) in advance.

First, one diagnostic criterion for predicting prognosis is selected from a plurality of diagnostic criteria (Step S20). Specifically, since this description assumes using the diagnostic threshold as the diagnostic criterion, a diagnostic threshold between 0% and 100% is selected so that values thereof differ in increments of a constant value on each selection. Here, when discontinuous values such as magnification are each used as the diagnostic criterion, the discontinuous values are selected in sequence.

Next, one case not yet selected is selected from the case database represented by FIG. 10 (Step S21).

Subsequently, on the case selected in Step S21, a diagnostic region is specified according to the diagnostic criterion selected in Step S20, and a positive rate of this diagnostic region is calculated (Step S22). This process can be performed in the same or like manner as described above in Steps S12 to S15.

It is then determined whether or not prognosis can be accurately predicted based on the positive rate calculated in Step S22 (Step S23). As a prediction method, threshold processing based on the positive rate may be performed, and not only the threshold, but also other clinical information may be used so that other methods such as logistic regression and SVM are applied to the prediction.

Next, it is determined whether or not there is any case that has not yet been selected in the case database, and when there is a case that has not yet been selected, the process returns to Step S21, while, when there is no case that has not yet been selected, the process proceeds to Step S25 (Step S24). It is determined in Step S25 whether or not there is any diagnostic criterion that has not yet been selected, and when there is a diagnostic criterion that has not yet been selected, the process returns to Step S20, while, when there is no diagnostic criterion that has not yet been selected, the process proceeds to Step S26.

At the end, on the premise that the prediction accuracy of prognosis in Step S23 exceeds a predetermined level (e.g., 70% accuracy), the diagnostic criterion with the highest prediction accuracy, in particular, is stored in the database 110 in association with the specimen information (Step S26). By doing so, the diagnostic criterion used in the most cases where prognosis has been accurately predicted is stored in the database 110 in association with the specimen information. Here, in Step S26, it may be that the diagnostic criterion with a prediction accuracy of prognosis simply higher than the predetermined accuracy is stored in the database 110 in association with the specimen information. FIG. 12 illustrates an example of prognosis prediction results with different diagnostic thresholds. In the example of FIG. 12, a case number 1201, a positive rate 1202, and prognosis 1203 are associated with each other for each of the five cases, and prediction accuracy for the prognosis 1203 is indicated in each item of the positive rate 1202 (each item of the diagnostic thresholds increasing in increments of 10%). The prediction accuracy 1204 indicates prediction accuracy in all the cases. In this example, prognosis (recurred or not) is most accurately predicted when the diagnostic threshold is 20%, with the result that 20% is adopted as the diagnostic threshold in Step S26. Although the prediction accuracy is calculated for each of the thresholds increasing in increments of 10% in the example of FIG. 12, it may be calculated for each of the thresholds increasing in increments of a smaller percentage.

By performing the above processing for each institution that prepared the case database and each type of staining, it is possible to create the database 110 which contains an appropriate diagnostic criterion according to the specimen information.

(Other Embodiments)

The above describes Embodiment 1 as an implementation of the pathological diagnosis support apparatus and the pathological diagnosis support method, but the above-described embodiment is a mere example, and the appended Claims are of a scope intended to cover and encompass not only this particular embodiment, but also equivalent structures, methods, and/uses. To the above-described embodiment, various modifications can be made that are conceived by those skilled in the art without departing from the teachings of the inventive concept. In addition, forms configured by combining structural elements and functions indicated in the embodiment are included in the scope of one or more of the aspects.

Figure 13:
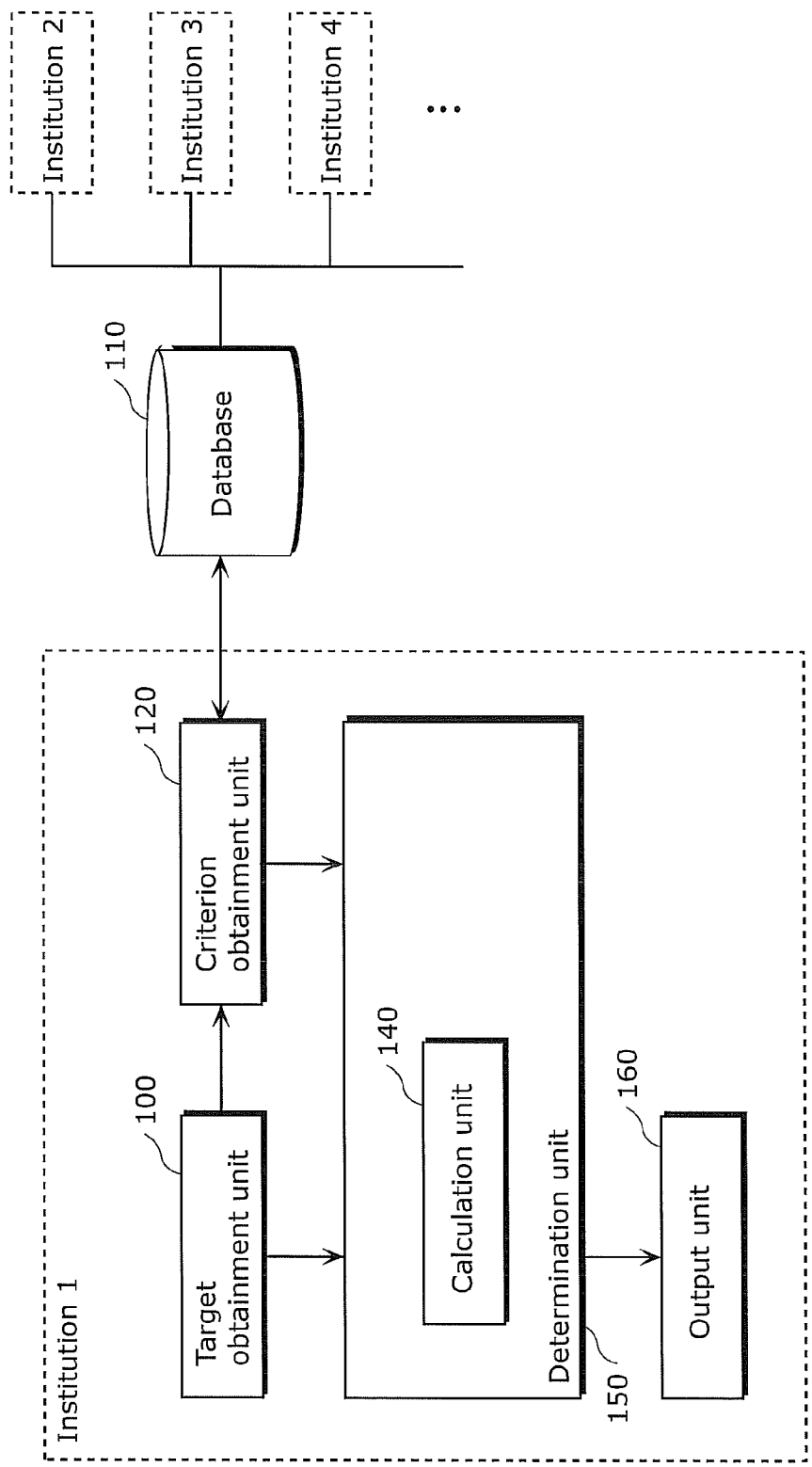
FIG. 13 is a system structure diagram illustrating a structure in which the database is shared.

For example, the database 110 described in Embodiment 1 may be installed in each institution that uses the pathological diagnosis support apparatus, and it may also be possible that the database 110 is placed on a network and shared by a plurality of institutions as illustrated in FIG. 13. In a system structure illustrated in FIG. 13, institutions 2, 3, and 4, etc., each include a pathological diagnosis support apparatus having the same or like structure as the institution 1. With this, it is possible to refer to the criterion in each institution from any of the institutions. This is useful in remote diagnosis, consultation by two or more doctors about diagnosis, and so on. It is to be noted that the database 110 contains the diagnostic criterion, but does not contain personal information or the like, therefore being suitable for sharing.

Furthermore, although Embodiment 1 describes the specimen image as representing the entirety of the pathological specimen, there may be some missing parts.

Each of the structural elements of the pathological diagnosis support apparatus described in Embodiment 1 may be realized by executing software (program) and may also be configured in the form of exclusive hardware. Software that provides the functional structural elements of the pathological diagnosis support apparatus in Embodiment 1 is a control program as follows.

In another general aspect, the techniques disclosed here feature a non-transitory recording medium having recorded thereon a control program for causing a computer to execute a pathological diagnosis support process of displaying a diagnostic region that is to be used as a target for diagnosis in a specimen image representing a specimen that is a target for pathological diagnosis, and the pathological diagnosis support process includes: obtaining the specimen image and specimen information related to a scheme for preparing the specimen; obtaining, from a database, a criterion corresponding to the specimen information obtained in the obtaining of the specimen image and specimen information, the database associating, for each of specimens, specimen information related to a scheme for preparing the each of specimens with a criterion indicating a condition of a positive rate which is to be satisfied by a region that is a target for diagnosis in a specimen image representing the each of specimens; (i) determining, based on the specimen image obtained in the obtaining of the specimen image and specimen information, regions that are each for calculating a positive rate in the specimen image, (ii) calculating the positive rate of each of the regions, and (iii) determining whether or not the positive rate satisfies a condition indicated by the criterion obtained in the obtaining of a criterion; and outputting, as the diagnostic region, each of one or more regions having the positive rate determined in the determining (iii) to satisfy the condition indicated by the criterion.

Furthermore, the above-stated control program may be recorded on a recoding medium and thereby distributed or circulated. For example, the distributed control program is installed on a device or the like, such as a computer, and then executed by the device or the like so that it is possible to cause the device or the like to perform various processes (such as the processes indicated in FIG. 3).

Forms configured by making to the above-described embodiments various modifications that can readily be conceived by those skilled in the art, and forms configured by combining the structural elements and functions described in the embodiments are included in the scope of one or more of the aspects.

INDUSTRIAL APPLICABILITY

One or more exemplary embodiments disclosed herein are applicable as a pathological diagnosis support apparatus for supporting pathological diagnosis.

The invention claimed is:

1. A pathological diagnosis support apparatus which outputs a diagnostic region that is to be used as a target for diagnosis in a specimen image representing a specimen that is a target for pathological diagnosis, the pathological diagnosis support apparatus comprising:
   a target obtainment unit configured to obtain the specimen image and specimen information related to a scheme for preparing the specimen;
   a criterion obtainment unit configured to obtain, from a database, a criterion corresponding to the specimen information obtained by the target obtainment unit, the database associating, for each of a plurality of specimens, specimen information related to a scheme for preparing each of the plurality of specimens with a criterion indicating a condition of a positive rate which is to be satisfied by a region that is a target for diagnosis in a specimen image representing each of the plurality of specimens;
   a determination unit configured to determine, based on the specimen image obtained by the target obtainment unit, whether or not a positive rate calculated for each of regions in the specimen image satisfies a condition indicated by the criterion obtained by the criterion obtainment unit; and
   an output unit configured to output, as the diagnostic region, each of one or more regions having the positive rate determined by the determination unit to satisfy the condition indicated by the criterion, wherein the criterion associated in the database with the specimen information related to the scheme for preparing each of the plurality of specimens indicates an upper limit of a ratio of a total size of regions selected in descending order of the positive rate calculated for each of the regions in the specimen image representing the plurality of specimens, relative to a size of an entire region of the specimen image, and wherein the determination unit is configured to determine that a positive rate of each of one or more regions having a total size smaller than or equal to the upper limit indicated by the criterion satisfies the condition, the one or more regions being selected in descending order of the positive rate calculated for each of the regions in the specimen image.

2. The pathological diagnosis support apparatus according to claim 1, further comprising
a calculation unit configured to determine each of the regions that is for calculating the positive rate in the specimen image, and calculate the positive rate.

3. The pathological diagnosis support apparatus according to claim 2,
wherein the output unit is further configured to output, for each of the one or more regions outputted as the diagnostic region, the positive rate calculated by the calculation unit.

4. The pathological diagnosis support apparatus according to claim 3,
wherein the specimen image represents an entirety of the specimen, and
wherein the output unit is configured to output an image of the diagnostic region and an image reduced in size from the specimen image and representing a position of the diagnostic region.

5. The pathological diagnosis support apparatus according to claim 2,
wherein the calculation unit is further configured to calculate an overall positive rate of all the one or more regions each having the positive rate determined by the determination unit to satisfy the condition indicated by the criterion, and
wherein the output unit is further configured to output the overall positive rate.

6. The pathological diagnosis support apparatus according to claim 1,
wherein the specimen information related to the scheme for preparing the specimen indicates information identifying a type of staining used for the specimen or an institution that prepared the specimen.

7. The pathological diagnosis support apparatus according to claim 1,
wherein the criterion further includes magnification information indicating a size of a region, the positive rate of which is to be calculated, and
wherein the determination unit is configured to determine whether or not a positive rate calculated for each of regions having a size indicated by the magnification information in the specimen image satisfies the condition indicated by the criterion except the magnification information.

8. The pathological diagnosis support apparatus according to claim 1,
wherein the criterion indicates a lower limit of the positive rate, and
wherein the determination unit is configured to determine that a positive rate of one of the regions in the specimen image for each of which the positive rate is calculated satisfies the condition when the positive rate of the one of the regions is greater than or equal to the lower limit indicated by the criterion.

9. The pathological diagnosis support apparatus according to claim 8,
wherein the criterion further includes magnification information indicating a size of a region, the positive rate of which is to be calculated, and
wherein the determination unit is configured to determine whether or not a positive rate calculated for each of regions having a size indicated by the magnification information in the specimen image satisfies the condition indicated by the criterion except the magnification information.

10. A pathological diagnosis support method of displaying a diagnostic region that is to be used as a target for diagnosis in a specimen image representing a specimen that is a target for pathological diagnosis, the pathological diagnosis support method comprising:
obtaining the specimen image and specimen information related to a scheme for preparing the specimen;
obtaining, from a database, a criterion corresponding to the specimen information obtained in the obtaining of the specimen image and specimen information, the database
associating, for each of a plurality of specimens, specimen information related to a scheme for preparing each of the plurality of specimens with a criterion indicating a condition of a positive rate which is to be satisfied by a region that is a target for diagnosis in a specimen image representing each of the plurality of specimens;
(i) determining, based on the specimen image obtained in the obtaining of the specimen image and specimen information, regions, each of which is for calculating a positive rate in the specimen image, (ii) calculating the positive rate of each of the regions, and (iii) determining whether or not the positive rate satisfies a condition indicated by the criterion obtained in the obtaining of a criterion; and
outputting, as the diagnostic region, each of one or more regions having the positive rate determined in the determining (iii) to satisfy the condition indicated by the criterion,
wherein the criterion associated in the database with the specimen information related to the scheme for preparing each of the plurality of specimens indicates an upper limit of a ratio of a total size of regions selected in descending order of the positive rate calculated for each of the regions in the specimen image representing the plurality of specimens, relative to a size of an entire region of the specimen image, and
wherein the determining includes determining that a positive rate of each of one or more regions having a total size smaller than or equal to the upper limit indicated by the criterion satisfies the condition, the one or more regions being selected in descending order of the positive rate calculated for each of the regions in the specimen image.

11. The pathological diagnosis support method according to claim 10,
wherein the condition of the positive rate which is to be satisfied by the region that is the target for diagnosis in the specimen image representing the specimen, indicated by the criterion in the database which is used in the obtaining of a criterion, is a condition under which it is predicted from past diagnosis results based on specimens that a probability that a result of a diagnosis made using a region satisfying the condition as the target for diagnosis is appropriate is higher than a predetermined threshold.

12. A non-transitory recording medium having recorded thereon a control program for causing a computer to execute a pathological diagnosis support process of displaying a diagnostic region that is to be used as a target for diagnosis in a specimen image representing a specimen that is a target for pathological diagnosis, the pathological diagnosis support process including:

obtaining the specimen image and specimen information related to a scheme for preparing the specimen;

obtaining, from a database, a criterion corresponding to the specimen information obtained in the obtaining of the specimen image and specimen information, the database associating, for each of a plurality of specimens, specimen information related to a scheme for preparing each of the plurality of specimens with a criterion indicating a condition of a positive rate which is to be satisfied by a region that is a target for diagnosis in a specimen image representing each of the plurality of specimens;

(i) determining, based on the specimen image obtained in the obtaining of the specimen image and specimen information, regions, each of which is for calculating a positive rate in the specimen image, (ii) calculating the positive rate of each of the regions, and (iii) determining whether or not the positive rate satisfies a condition indicated by the criterion obtained in the obtaining of a criterion; and outputting, as the diagnostic region, each of one or more regions having the positive rate determined in the determining (iii) to satisfy the condition indicated by the criterion, wherein the criterion associated in the database with the specimen information related to the scheme for preparing each of the plurality of specimens indicates an upper limit of a ratio of a total size of regions selected in descending order of the positive rate calculated for each of the regions in the specimen image representing the plurality of specimens, relative to a size of an entire region of the specimen image, and wherein the determining includes determining that a positive rate of each of one or more regions having a total size smaller than or equal to the upper limit indicated by the criterion satisfies the condition, the one or more regions being selected in descending order of the positive rate calculated for each of the regions in the specimen image.

* * * * *